United States Patent
Brennan

(10) Patent No.: US 8,667,954 B2
(45) Date of Patent: Mar. 11, 2014

(54) SIMULTANEOUSLY FIRING TWO CYLINDERS OF AN EVEN FIRING CAMLESS ENGINE

(75) Inventor: Daniel G. Brennan, Brighton, MI (US)

(73) Assignee: GM Global Technology Operations LLC

( * ) Notice: Subject to any disclaimer, the term of this patent is extended or adjusted under 35 U.S.C. 154(b) by 278 days.

(21) Appl. No.: 13/238,388

(22) Filed: Sep. 21, 2011

(65) Prior Publication Data

US 2013/0068194 A1 Mar. 21, 2013

(51) Int. Cl.
*F02D 13/04* (2006.01)

(52) U.S. Cl.
USPC .......................................................... 123/321

(58) Field of Classification Search
USPC ................. 123/320, 321, 322, 345–348, 351, 123/406.24, 406.25, 406.5, 90.15, 90.11, 123/436, 481, 491, 492, 493; 701/103, 110, 701/112, 113
See application file for complete search history.

(56) References Cited

U.S. PATENT DOCUMENTS

| | | | |
|---|---|---|---|
| 6,050,231 A * | 4/2000 | Tisch et al. ................. | 123/179.1 |
| 6,886,510 B2 | 5/2005 | Sun et al. | |
| 7,063,059 B2 * | 6/2006 | Calderwood .......... | 123/146.5 A |
| 7,104,235 B2 * | 9/2006 | Brehob et al. ............. | 123/179.5 |
| 7,240,663 B2 * | 7/2007 | Lewis et al. .................... | 123/321 |
| 7,278,388 B2 * | 10/2007 | Lewis et al. ................. | 123/179.5 |
| 7,354,379 B2 * | 4/2008 | Moriya ......................... | 477/199 |
| 7,540,268 B2 * | 6/2009 | Lewis et al. ................. | 123/179.5 |
| 7,673,608 B2 * | 3/2010 | Lewis et al. ................. | 123/179.5 |
| 7,949,461 B2 * | 5/2011 | Takahashi ..................... | 701/113 |
| 8,423,271 B2 * | 4/2013 | Gibson et al. .................. | 701/112 |
| 2005/0211194 A1* | 9/2005 | Hanson et al. ................... | 123/21 |
| 2012/0208674 A1* | 8/2012 | Doering et al. ............... | 477/107 |
| 2013/0179054 A1* | 7/2013 | Calva et al. .................... | 701/113 |

\* cited by examiner

Primary Examiner — Hai Huynh

(57) ABSTRACT

A valve control system includes an engine speed control module that determines an engine speed and a desired engine stop position. A piston position module determines a desired stopping position of a first piston based on the desired engine stop position. A valve control module receives the desired stopping position, commands a set of valves to close at the desired stopping position if the engine speed is less than a predetermined shutdown threshold, and commands the set of valves to reduce the engine speed if the engine speed is greater than the predetermined shutdown threshold.

14 Claims, 5 Drawing Sheets

SIMULTANEOUSLY FIRING TWO CYLINDERS OF AN EVEN FIRING CAMLESS ENGINE

STATEMENT OF GOVERNMENT RIGHTS

This invention was produced pursuant to U.S. Government Contract No. DE-FC26-05NT42415 with the Department of Energy (DoE). The U.S. Government has certain rights in this invention.

FIELD

The present application relates to internal combustion engines and more particularly to controlling valve position and firing sequence in an engine with variable valve actuation (VVA).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons. For example only, in gasoline combustion engines, air flow can be regulated via a throttle body or directly by a cylinder's intake and exhaust air valves. A fuel control system adjusts the rate that fuel is injected to provide a desired air/fuel (A/F) mixture to the cylinders.

A piston compresses the A/F mixture by moving to a top dead center (TDC) position. The A/F mixture is then ignited by a spark, which forces the piston to a bottom dead center (BDC) position. Combusted gasses are expelled through an exhaust valve and out of the engine as the piston returns to the TDC position. The A/F mixture is drawn back into the cylinder as the piston moves to the BDC position.

SUMMARY

A valve control system includes an engine speed control module that determines an engine speed and a desired engine stop position. A piston position module determines a desired stopping position of a first piston based on the desired engine stop position. A valve control module receives the desired stopping position, commands a set of valves to close at the desired stopping position if the engine speed is less than a predetermined shutdown threshold, and commands the set of valves to reduce the engine speed if the engine speed is greater than the predetermined shutdown threshold.

In other features, a dual piston firing system includes a combustion module that determines a cylinder firing order. A piston control module determines a first cylinder in the cylinder firing order and a second cylinder in the cylinder firing order. A valve control module commands respective intake valves of the first and second cylinders to an open position. A fuel control module commands a fuel quantity to the first and second cylinders. A spark control module commands a spark to the first and second cylinders. The first and second cylinders are fired simultaneously in a first combustion event.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
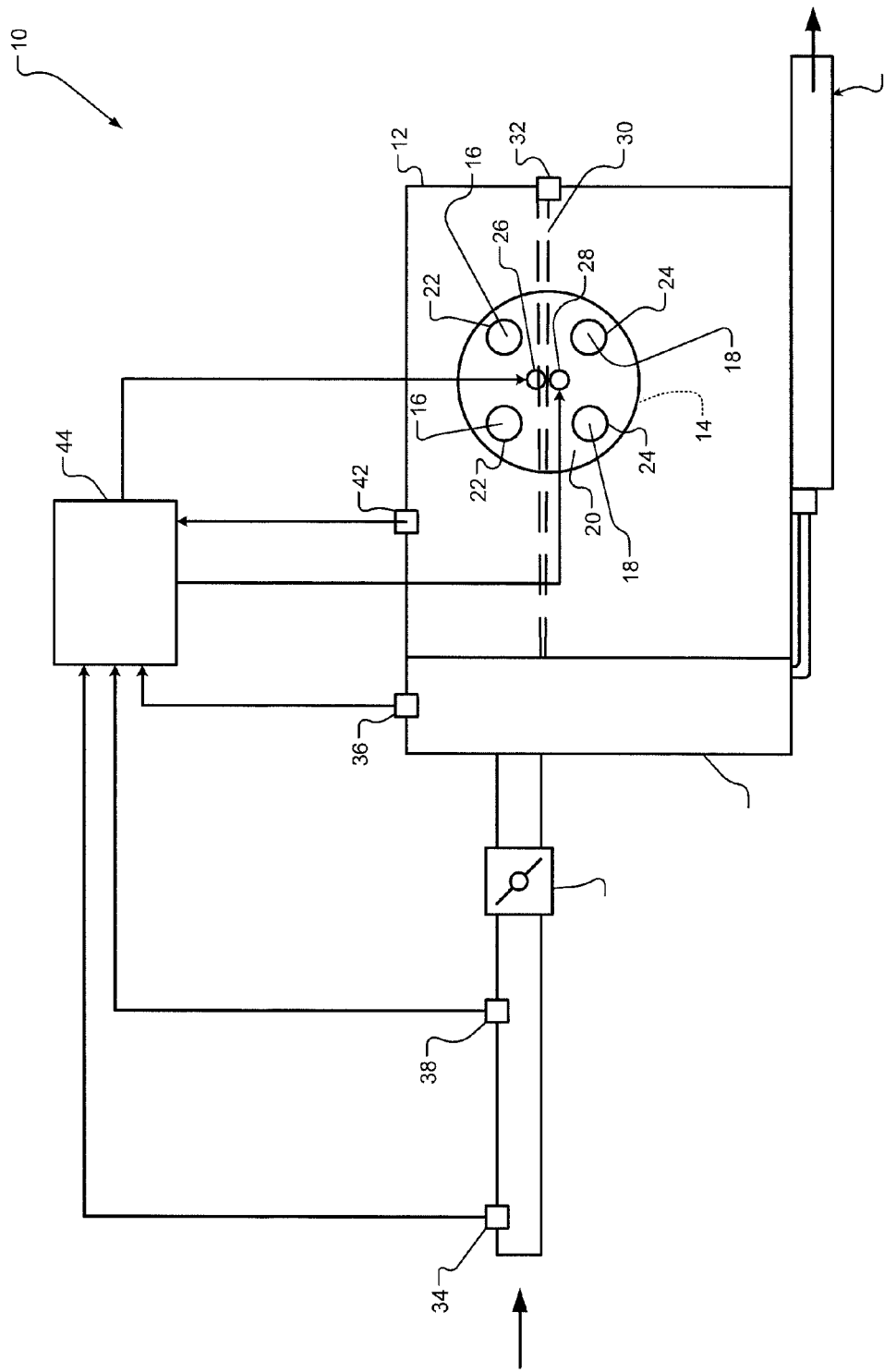
FIG. 1 is a schematic illustration of an engine assembly according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A valve control system of the present disclosure controls a stopping position of the pistons during an engine shutdown and stores a location of the piston positions. Accordingly, on an engine restart, injectors of two or more pistons may be fired simultaneously to decrease start times and drive-away times (e.g., in vehicles including an autostart engine). While it is to be understood that more than two pistons may be fired simultaneously according to the principles of the present disclosure, an arrangement involving two pistons being fired simultaneously will be referenced throughout for simplicity.

Referring to FIG. 1, an engine 10 is schematically illustrated. The engine 10 may include an engine block 12 defining a plurality of cylinders 14 and a cylinder head defining intake ports 16 and exhaust ports 18. The engine 10 may further include pistons 20, intake valves 22, exhaust valves 24, spark plugs 26, and fuel injectors 28. The pistons 20 are located in the cylinders 14 and engaged with the crankshaft 30. The intake valves 22 are located in the intake ports 16 and the exhaust valves 24 are located in the exhaust ports 18. The spark plugs 26 and fuel injectors 28 are in communication with the cylinders 14. While the engine 10 may include multiple cylinders 14, for illustration purposes a single representative cylinder is shown. For example only, the engine 10 may include 2, 3, 4, 5, 6, 8, 10, and/or 12 cylinders 14. It is understood that the present disclosure applies equally to any number of piston-cylinder arrangements, as well as a variety of engine configurations including, but not limited to, inline, V-configuration and horizontally opposed arrangements. In the present non-limiting example, the fuel injectors are in direct communication with the cylinders, forming a direct injection arrangement. However, it is understood that the present disclosure is not limited to direct injection applications and may also apply to port injection arrangements. The engine further includes a crankshaft position sensor 32, an intake air temperature sensor 34, an intake air pressure sensor 36, a mass airflow sensor 38, and an engine coolant temperature sensor 42.

The control module 44 may implement an auto-start/stop system that increases the fuel efficiency of the vehicle. The control module increases fuel efficiency by selectively shutting down the engine 10 while the vehicle is running. The control module 44 may selectively initiate auto-stop events and auto-start events of the engine 10. An auto-stop event includes shutting down the engine 10 when one or more predetermined enabling criteria are satisfied and when vehicle shutdown has not been commanded (e.g., while the ignition key is in an on position). During an auto-stop event, the control module 44 may shut down the engine 10 and disable the provision of fuel to the engine 10, for example, to increase fuel economy (by decreasing fuel consumption). While the engine 10 is shut down during an auto-stop event, the control module 44 may selectively initiate an auto-start event. An auto-start event may include, for example, enabling fueling and enabling the provision of spark to start the engine 10.

The control module 44 may implement a valve control system in an engine 10 with a variable valve actuation (VVA) system. A VVA system is capable of adjusting (e.g., opening and/or closing) an intake valve at a time other than predetermined opening and closing times. Exemplary types of VVA systems may include, for example, early intake valve closure (EIVC) systems, late intake valve closure (LIVC) systems, dual independent cam phasing (DICP) systems, camless VVA systems and other suitable VVA systems. An example camless VVA system is disclosed in U.S. Pat. No. 6,886,510, which is hereby incorporated by reference herein in its entirety.

Figure 2:
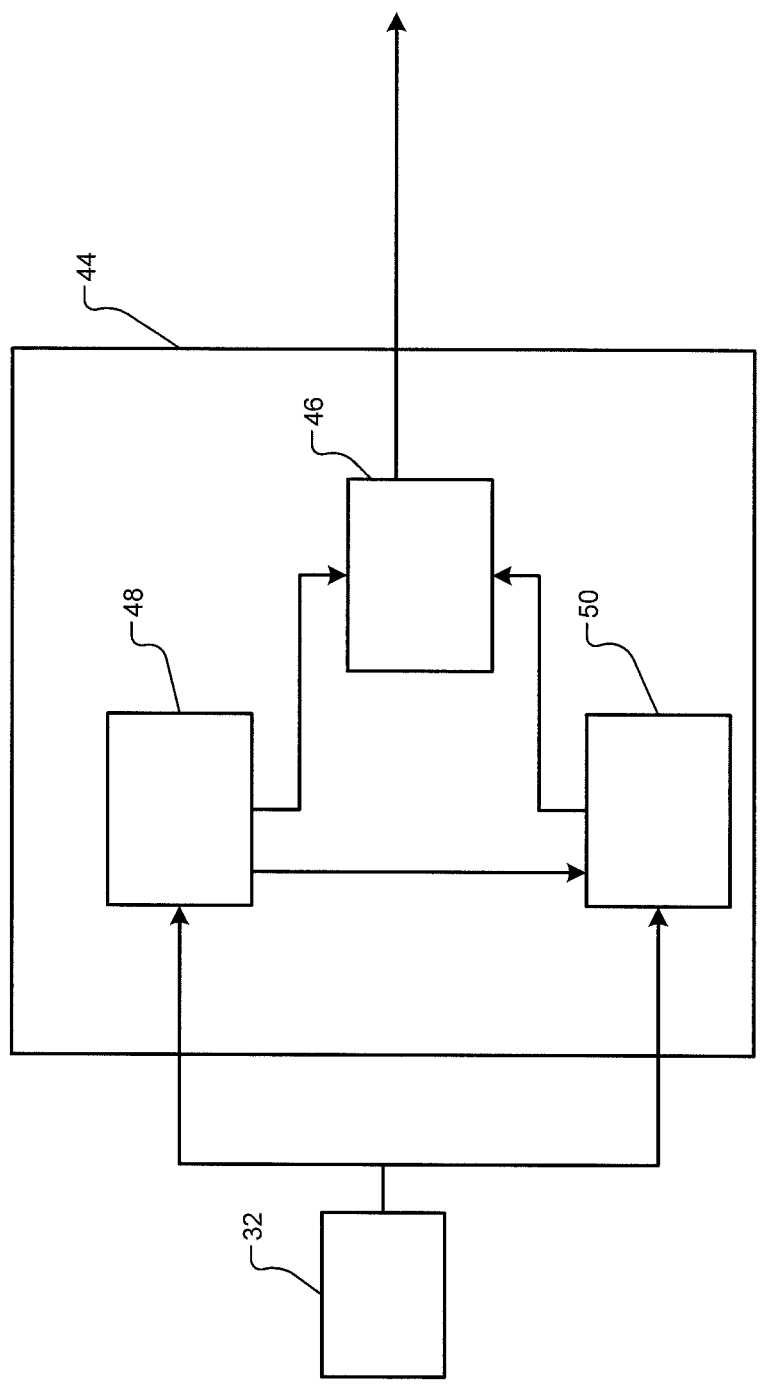
FIG. 2 is a schematic illustration of a control module implementing a valve control system according to the present disclosure.

Referring now to FIG. 2, the control module 44 includes a valve control module 46, an engine speed control module 48, and a piston control module 50. The engine speed control module 48 receives a signal from the crankshaft position sensor 32 and determines a current engine speed in revolutions per minute (RPM). The engine speed control module 48 compares the current engine speed to a predetermined shutdown threshold. The predetermined shutdown threshold is set within a predetermined range (e.g., between 20 and 50 RPM). If the current engine speed is above the predetermined shutdown threshold, the engine speed control module 48 determines a coastdown profile to slow the engine and outputs the coastdown profile to the valve control module 46. The coastdown profile evaluates variables, such as airflow from the mass airflow sensor 38 and engine speed from the crankshaft position sensor 32, to determine the optimal profile to slow the engine 10 to a stop at a desired rate. If the current engine speed is below the predetermined shutdown threshold, the engine speed control module 48 determines a desired engine stop position and communicates the engine stop position to the piston control module 50. The desired engine stop position corresponds to the desired top dead center (TDC) stopping position of two selected pistons 20 when the engine 10 is shut down.

The crankshaft position sensor 32 provides a signal indicating crankshaft position to the piston control module 50. The piston control module 50 determines piston 20 position based on crankshaft 30 position. The piston control module 50 receives the desired engine stop position from the engine speed control module 48. Based on the desired engine stop position and the current piston position, the piston control module 50 determines the stopping position of a first piston 20 and communicates the stopping position of the first piston 20 to the valve control module 46. The stopping positions of the remainder of the pistons 20 may be fixed relative to the position of the first piston 20.

The valve control module 46 receives the current engine speed and the coastdown profile from the engine speed control module 48, and receives the stopping position from the piston control module 50. The valve control module 46 selectively slows the engine speed and/or stops the engine based on the engine speed, the coastdown profile, and the stopping position. For example, if the current engine speed is greater than the predetermined shutdown threshold, the valve control module 46 closes a set of valves 22, 24 corresponding to the selected pistons 20 according to the coastdown profile to slow the engine speed. The valve control module 46 determines desired valve lift as a function of engine speed based on the coastdown profile in order to slow the engine 10 to a stop at a desired rate. If the current engine speed is less than the predetermined shutdown threshold or the valve control module 46 slows the engine speed to less than the predetermined shutdown threshold, the valve control module 46 commands the valves 22, 24 to stop the engine at the desired piston position. The valve control module 46 commands the valve lift and valve timing to act as a variable air damper and provide an engine braking force slowing the engine speed.

Figure 3:
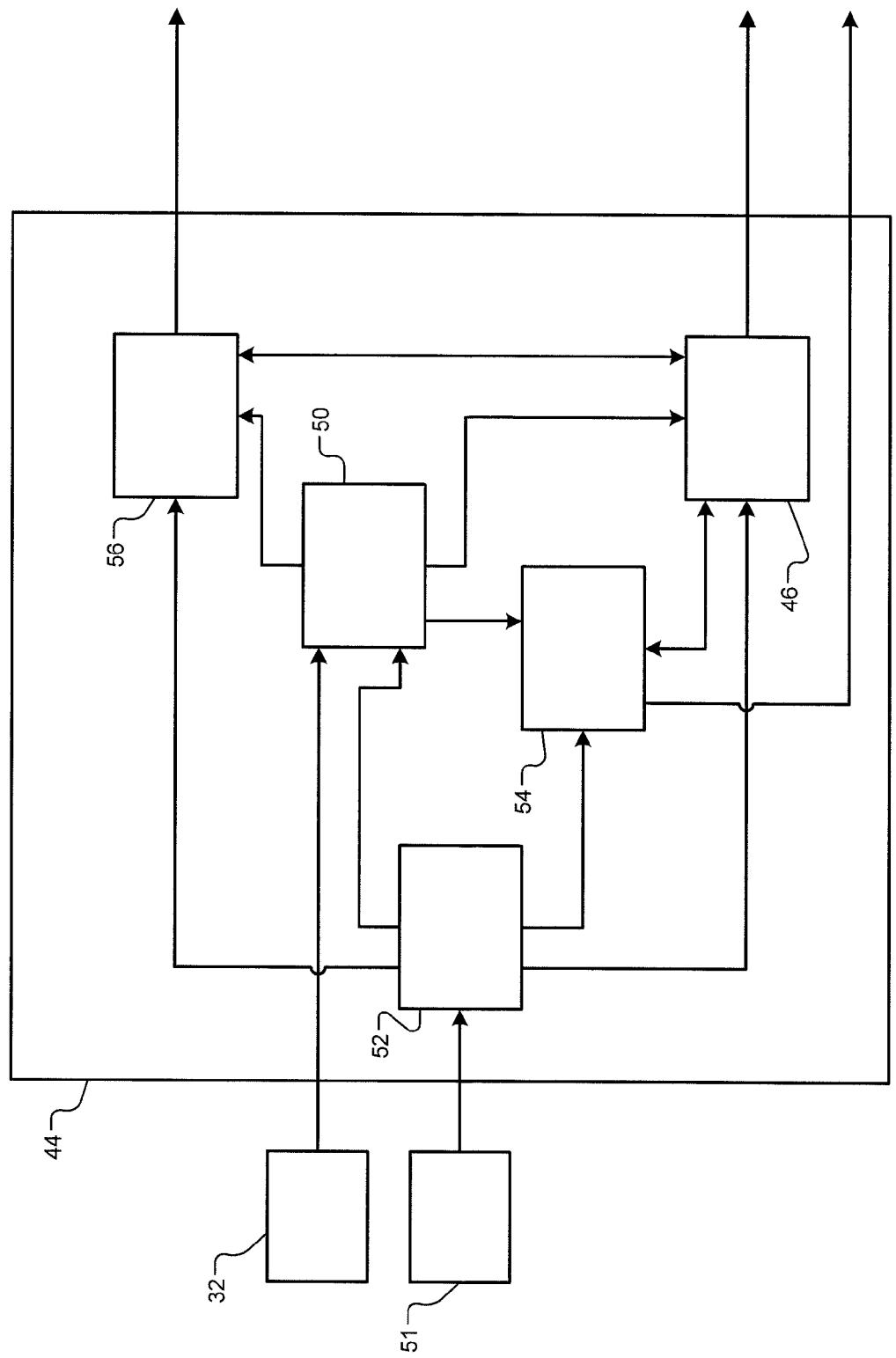
FIG. 3 is a schematic illustration of a control module implementing a dual piston firing system according to the present disclosure.

Referring to FIG. 3, the control module 44 may include the valve control module 46 and the piston control module 50 as described in FIG. 2, a combustion module 52, a fuel control module 54, and a spark module 56. A combustion module 52 receives signals from engine sensors 51 (for example only, engine sensors indicating an engine on condition) and determines a cylinder firing order when the engine 10 is started.

The combustion module 52 communicates the firing order to the piston control module 50, the valve control module 46, the spark module 56, and the fuel control module 54.

The crankshaft position sensor 32 provides a signal indicating crankshaft position (i.e., the rotational position of the crankshaft) to the piston control module 50. The piston control module 50 may determine piston position based on the crankshaft position. The piston control module 50 further determines whether any two pistons 20 are in a top dead center (TDC) position (e.g., within a predetermined range of the TDC position) from the firing order that is communicated to the piston control module 50 from the combustion module 52. For example only, the predetermined range is between six degrees before and six degrees after the TDC position. The cylinders housing the two pistons located within the predetermined range will be a first and a second cylinder in the cylinder firing order. The piston control module 50 communicates information identifying the two pistons 20 in the TDC position to the fuel control module 54, the spark module 56, and the valve control module 46.

The valve control module 46 receives the cylinder firing order from the combustion module 52 and the location of the pistons 20 in the TDC position from the piston control module 50 and commands the intake and exhaust valves to open and closed positions corresponding to these signals. The valve control module 46 communicates with the spark module 56 and the fuel control module 54 to pair the valve lift and timing with fueling and spark to each cylinder 14.

The fuel control module 54 receives the cylinder firing order from the combustion module and the location of the pistons 20 in the TDC position from the piston control module 50 and commands fuel delivery to the two pistons 20 in the TDC position. The fuel control module 54 communicates with the spark module 56 and valve control module 46 to pair fuel delivery with spark timing and valve lift and timing for each cylinder 14.

The spark module 56 receives the cylinder firing order from the combustion module 52 and the location of the pistons 20 in the TDC position from the piston control module 50 and commands the spark plug timing for the two pistons 20 in the TDC position. The spark module 56 communicates with the fuel control module 54 and the valve control module 46 to pair spark timing with fuel delivery and valve lift and timing for each cylinder 14.

Figure 4:
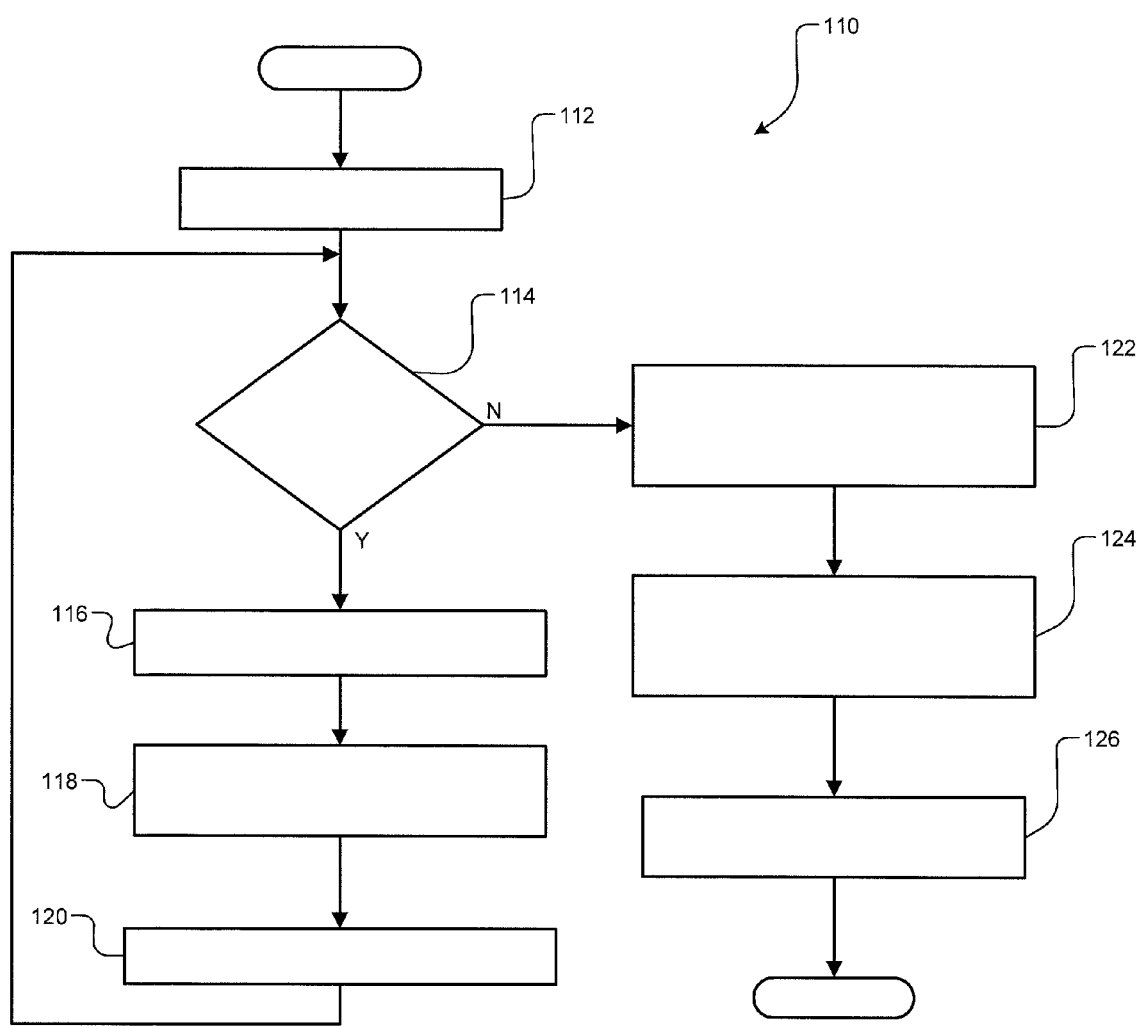
FIG. 4 is a flow diagram of a valve control method according to the present disclosure.

Referring now to FIG. 4, a valve control method 110 is illustrated for the valve control system. At 112, the method 110 commands the engine to shut down. The commanded shut down may either correspond to a key off position or an auto-stop command. An engine off condition may generally correspond to pistons 20 within the cylinders 14 being stationary. An engine on condition may generally correspond to pistons 20 within the cylinders 14 being driven by combustion events within the cylinders 14.

At 114, the method 110 determines a current engine speed. If the engine speed exceeds the predetermined shutdown threshold, the method 110 proceeds to 116. At 116, a coastdown profile is determined to reduce the engine speed. At 118, the method 110 determines valve lift as a function of engine speed. At 120, the method 110 commands the desired valve lift to reduce the engine speed. At 114, engine speed is reevaluated. If the engine speed again exceeds the shutdown threshold, a coastdown profile is determined at 116, valve lift is determined at 118, and valve lift is commanded at 120 to again reduce engine speed. The cycle is repeated until engine speed is less than the shutdown threshold.

If, at 114, the engine speed is less than the shutdown threshold, the method 110 proceeds to 122. At 122, the method 110 determines the desired engine stop position. The stopping position of a first piston 20 is determined and the remaining positions of the pistons are fixed relative to the position of the first piston 20. At 124, all applicable valves 22, 24 are timed to close at the desired engine stop position. At 126, the valves are closed.

Figure 5:
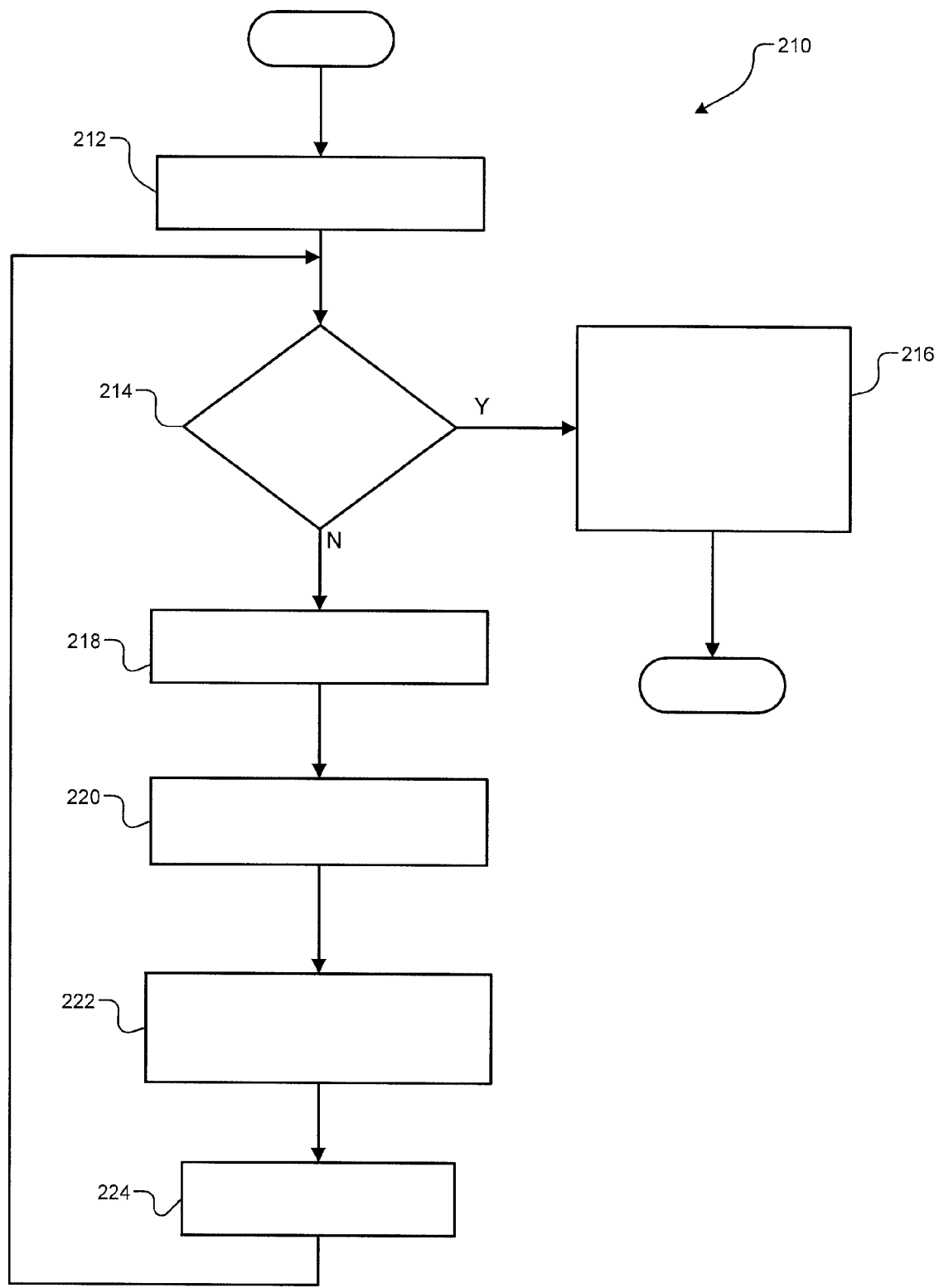
FIG. 5 is a flow diagram of a dual piston firing method according to the present disclosure.

Referring now to FIG. 5, a dual piston firing method 210 is illustrated for the controlled cylinder firing system. The engine 10 is commanded on at 212. At 214, the method 210 determines whether a fuel injector 28 in a cylinder 14 has fired since the engine-on condition. If the fuel injector 28 in a cylinder 14 has fired, the method 210 continues to 216. At 216, the fuel injector 28 in the next cylinder 14 in the sequence is fired. The method 210 then terminates. If the fuel injector 28 in a cylinder 14 has not fired, the method 210 continues to 218. At 218, the first two pistons 20 in the firing order located in the TDC position are determined. At 220, the intake 22 and exhaust valves 24 are switched for the first stroke of the piston 20 that is positioned at TDC of the intake stroke. At 222, the valve lift and timing, fuel delivery, and spark timing of oppositely phased cylinders are paired together for firing. At 224, the fuel injectors 28 in the cylinders 14 are fired. The method 210 returns to 214 and evaluates whether the fuel injector 28 in a cylinder 14 has fired after the engine on condition. The method 210 determines that the fuel injector 28 in a cylinder 14 has fired and the method 210 proceeds to 216 and fires the injector 28 of the next cylinder 14 in sequence. The method 210 then terminates.

Engine operation then continues. The fuel injectors 28 in the remainder of the cylinders 14 are fired in the correct cylinder firing order, except the second cylinder is skipped since the fuel injector 28 in the second cylinder fired on the first firing event in conjunction with the first cylinder. When the engine 10 completes a first firing cycle, the engine 10 resumes a normal engine firing rotation.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A valve control system comprising:
an engine speed control module that determines an engine speed and a desired engine stop position;
a piston position module that determines a desired stopping position of a first piston based on the desired engine stop position;
a valve control module that receives the desired stopping position, commands all of a set of valves corresponding to the first piston to close at the desired stopping position if the engine speed is less than a predetermined shutdown threshold, and commands the set of valves to reduce the engine speed if the engine speed is greater than the predetermined shutdown threshold.

2. The valve control system of claim 1, wherein the desired stopping position of the piston is determined after an engine shutdown is commanded.

3. The valve control system of claim 2, wherein the engine speed control module determines the desired engine stop position of the piston if the engine speed is less than the predetermined shutdown threshold.

4. The valve control system of claim 2, wherein the engine speed control module determines a coastdown profile if the engine speed is greater than the predetermined shutdown threshold.

5. The valve control system of claim 4, wherein the valve control module receives the engine speed from the engine speed control module and determines a desired valve lift as a function of the engine speed.

6. The valve control system of claim 5, wherein the valve control module commands the desired valve lift to reduce the engine speed.

7. The valve control system of claim 2, wherein the piston position module determines a position of the piston from a crankshaft position sensor.

8. A valve control method comprising:
determining an engine speed and a desired engine stop position;
determining a desired stopping position of a first piston based on the desired engine stop position;
commanding all of a set of valves corresponding to the first piston to close at the desired stopping position if the engine speed is less than a predetermined shutdown threshold, and commanding the set of valves to reduce the engine speed if the engine speed is greater than the predetermined shutdown threshold.

9. The valve control method of claim 8, wherein the desired stopping position of the piston is determined after an engine shutdown is commanded.

10. The valve control method of claim 9, further comprising determining the desired engine stop position of the piston if the engine speed is less than the predetermined shutdown threshold.

11. The valve control method of claim 9, further comprising determining a coastdown profile if the engine speed is greater than the predetermined shutdown threshold.

12. The valve control method of claim 11, further comprising determining a desired valve lift as a function of the engine speed.

13. The valve control method of claim 12, further comprising commanding the desired valve lift to reduce the engine speed.

14. The valve control method of claim 9, further comprising determining a position of the piston from a crankshaft position sensor.

* * * * *